United States Patent [19]

Chiao

[11] Patent Number: 4,592,836
[45] Date of Patent: Jun. 3, 1986

[54] ELECTROSTATIC ENGINE OIL CLEANER

[76] Inventor: Yi-Shong Chiao, No. 4-2, La. 3, Tai An St., Taipei, Taiwan

[21] Appl. No.: 608,683

[22] Filed: May 10, 1984

[51] Int. Cl.[4] .............................................. B01D 41/00
[52] U.S. Cl. ..................................... 210/168; 210/243; 210/332; 210/342; 210/416.5; 210/493.1; 123/196 A
[58] Field of Search ............... 210/167, 168, 194, 243, 210/222, 223, 416.1, 416.5, 258, 332, 342, 488, 492, 493.1; 123/196 A; 134/10, 109; 310/228; 361/225, 226, 230, 231; 55/122, 123, 154

[56] References Cited

U.S. PATENT DOCUMENTS

| 987,117 | 3/1911 | Cottrell et al. | 210/243 |
| 1,559,035 | 10/1925 | Egloff et al. | 210/243 |
| 1,831,075 | 11/1931 | Neeley | 210/243 |
| 3,415,738 | 12/1968 | Nicodimescu | 210/243 |
| 3,788,473 | 1/1974 | King | 210/243 |
| 4,161,013 | 7/1979 | Grodzinsky et al. | 210/243 |
| 4,238,326 | 12/1980 | Wolf | 210/243 |
| 4,350,590 | 9/1982 | Robinson | 210/243 |

Primary Examiner—Richard V. Fisher
Assistant Examiner—Wanda L. Millard
Attorney, Agent, or Firm—Armstrong, Nikaido, Marmelstein & Kubovcik

[57] ABSTRACT

The present invention is an engine oil cleaner comprising the oil cleaner body, a corrugated porous paper board (or non-corrugated porous paper board), a polar plate, a filter cartridge, an electric conduction spring plate, several insulating rubber items and a high voltage electrostatic generator, wherein its feature lies in that the high voltage electrostatic generator is used to produce a electrostatic field between the casing body of the engine oil cleaner body and the polar plate and in this electrostatic field fully fills up the engine oil cleaner body, thus making the very small metal particles inducted and hereby possess electric charges which then are absorbed on the surface of the corrugated porous paper board, and the filter cartridge is used to filter out the smaller metal particles twice and also to eliminate the moisture and the catalysts such as the extraneous matters in the engine oil, thus preventing the engine oil from becoming deteriorated as well as extending the life of the engine oil so as to insure the lubrication functions of the engine oil in the engine system.

1 Claim, 4 Drawing Figures

ELECTROSTATIC ENGINE OIL CLEANER

DETAILED DESCRIPTION OF THE INVENTION

Since the engine oil plays an important role in the operational process of the engine system, whether its quality is pure and good has a direct impact on the normal operation and service life of the engine, and after being used for a period of time, the engine oil must be totally replaced with a new one in order to maintain the normal operation of the engine system and to prevent the polluted oil from causing damages to the engine.

In view of this, energetically devoting himself to the in-depth research through repeated experiments, this inventor has finally and successfully developed the said engine oil cleaner to make the engine, in its operation and by its quality, simple, new and sturdy structural arrangements, cleanse the engine oil all the time and continuedly filter out the moisture and extraneous matters contained in the engine oil, thus extending the engine oil service rate and the engine life as the main object of the present invention.

Now, the structure, installation, technical contents and functions of the present invention are described in conjunction with the accompanied drawings as follows for the commissioners of the examination committee to have a complete understanding about it:

Figure 1:
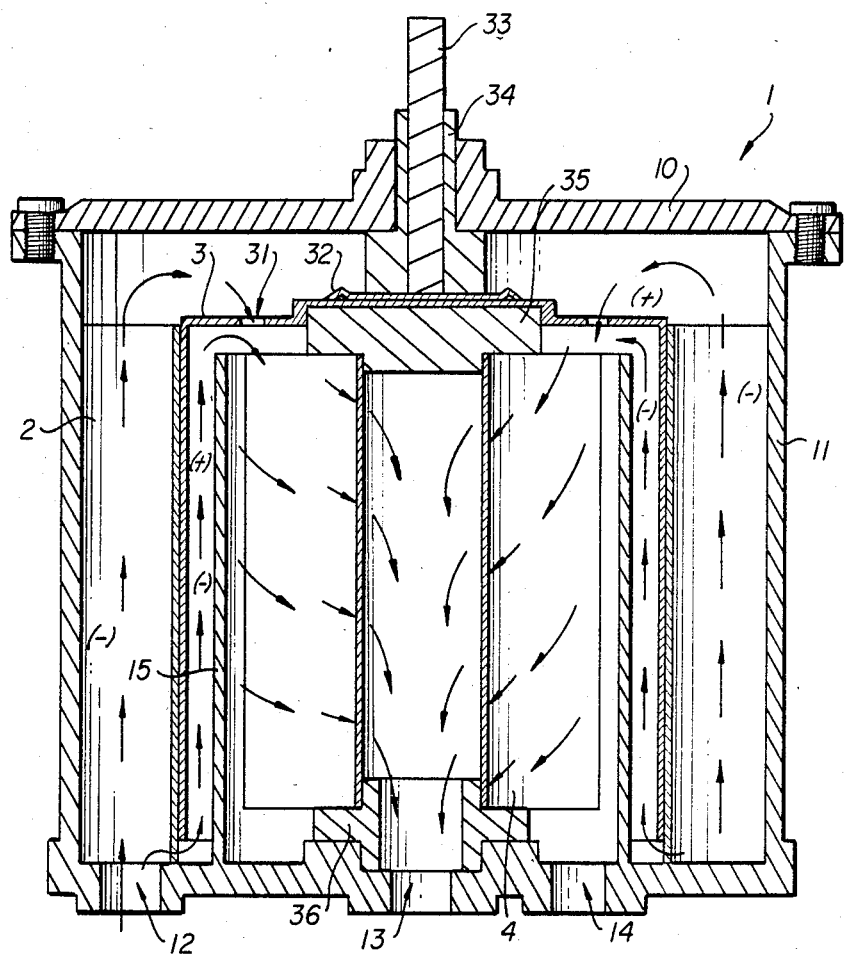
FIG. 1 is the profile view of the installation of the structure of the present invention.
Figure 2:
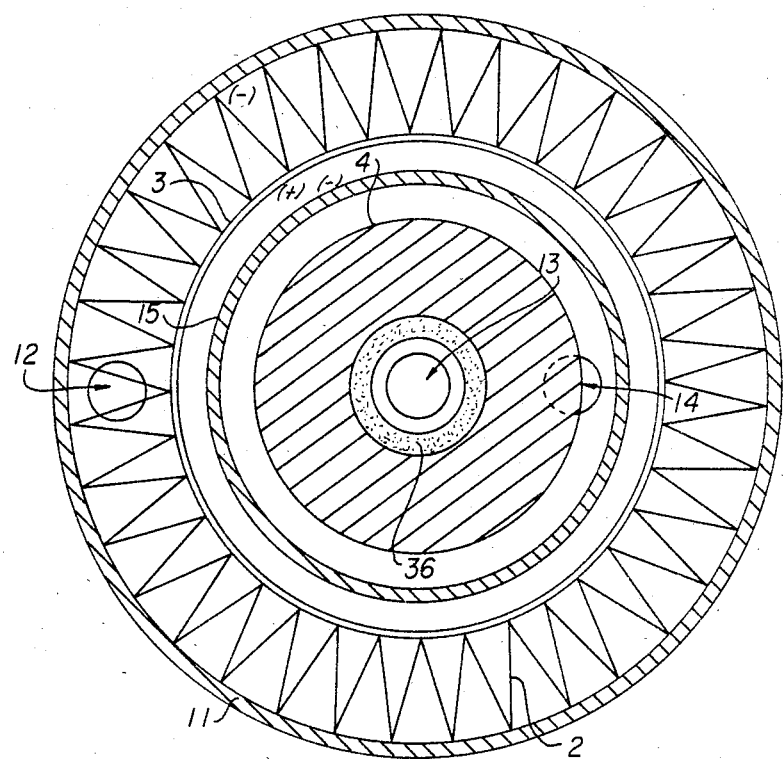
FIG. 2 is the cross sectional view of the installation of the structure of the present invention.

Please refer to the drawings. The present invention mainly comprises the engine oil cleaner body 1, the corrugated porous paper board 2, the polar plate 3, the filter cartridge, the electric conduction spring plate 32, the insulation packings 34, 35, and 36 and the high voltage electrostatic generator 6, of which the engine oil cleaner body 1 is composed by two parts, namely the metal casing body, i.e. the outer casing 11, inner casing 15, and upper cover 10, a cleaned oil outlet 13 is provided at the center of the bottom of the casing body, a polluted oil inlet 12 is provided between the bottoms of the inner casing 15 and the outer casing 11, an impurities outlet 14 is provided in the inner part of the inner casing 15 and the and the outside part of the filter cartridge 4, the filter cartridge 4 clamped and firmly fixed by the upper and lower insulation packings 35 and 36 respectively is made by the filter paper foamed resin or fiber bundles, the polar plate 3 is placed above the rubber packing 35 and also sleeved on outside of the inner casing 15, on this polar plate 3, many through holes 31 are provided, as to the corrugated porous paper board 2, it is placed between the polar plate 3 and the outer casing 11, the outer high voltage electrostatic conduction line 33 passes through the upper cover 10, and the electric conduction spring plate 32 which is closely leaning on the polar plate 3 and the metal upper cover 10 are used, together with the insulation rubber 34, for separation and packing.

Oil pump 71 pumps the polluted engine oil in the engine 7 to the contamination oil inlet 12 of the engine oil cleaner 1 from the contamination oil outlet 72, thus making the engine oil cleaner 1 filled full with the contamination oil, at the same time, supplied with the electric power by the storage battery 5, the the high voltage electrostatic generator 6 generates a electrostatic field which is transmitted to the polar plate 3 through a conduction line to make the pole as a positive one, the metal outer casing 11, the inner casing 15 and the upper cover 10 are grounded and thus are the negative pole in nature. For instance, if this is used in an automobile, along with the car body (chassis), the outer casing 11 of the engine oil cleaner is the negative pole, thus, in the polar plate 3 and the outer casing 11, the inner casing 15 or the upper cover 10, a electrostatic field can be produced. Once the engine oil is delivered by the oil pump 71 from the contamination oil inlet 12 to the engine oil cleaner 1, under the influence and action of the electrostatic field, the impurities or extraneous particles in the contamination oil will be inducted to have electric charges. By the mutual attraction between the positive and negative charges the impurities or extraneous particles will be absorbed on the corrugated porous paper board 2 between the outer casing 11 and the polar plate 3. The engine oil, after being filtered one time, becomes purer, and along the flow direction as indicated by the arrows in the attached drawings in sequence, flows and passes through the filter cartridge 4. Small particles can be forcibly absorbed on the minute holes or the surface of the filter cartridge with an accuracy of approximately 0.05 micron. Finally the completely cleaned engine oil flows out of the cleaned oil outlet 13 and, via the installed pipeline, and returns to the engine 7 from the returned oil inlet 73.

Absorbed on the corrugated porous paper board 2 and the surface of the filter cartridge 4, the impurities or extraneous particles accumulate to a considerable quantity, which due to influence of gravity, will automatically drop to the bottom of the cleaned oil, and after a certain period of time, the user can remove the deposited extraneous particles from the impurities outlet 14 in order to extend the service life of the filter cartridge 4 and or the porous paper board 2; if there are too much impurities deposited therein that may touch the two poles, there is no worry about the damage to the engine oil cleaner 1, since the high voltage electrostatic generator 6 has been provided with a general automatic short-circuit trip switch design.

The functions of the present invention are to use the electrostatic field, the porous paper board and the filter cartridge to collect and capture the impurities or extraneous particles in the engine oil, to separate and eliminate the moisture in the oil to inhibit the oxidation of the engine oil, and through repeated cyclic processes, to completely absorb and filter out the contamination particles, thus maintaining the fresh operational functions of the engine oil in the engine, and also extending the service life of the engine, preventing the engine from being damaged due to excessive tear and wear, saving the combustion fuel and decreasing the black exhausts and air pollution, while the engine oil in the lubrication system is under the semi-permanent nature, so only a partial resupply of it is needed, but, of course, this invention would not impose any restrictions on the oil resupply, if the users wishes to refill it to the fullest level.

Figure 3:
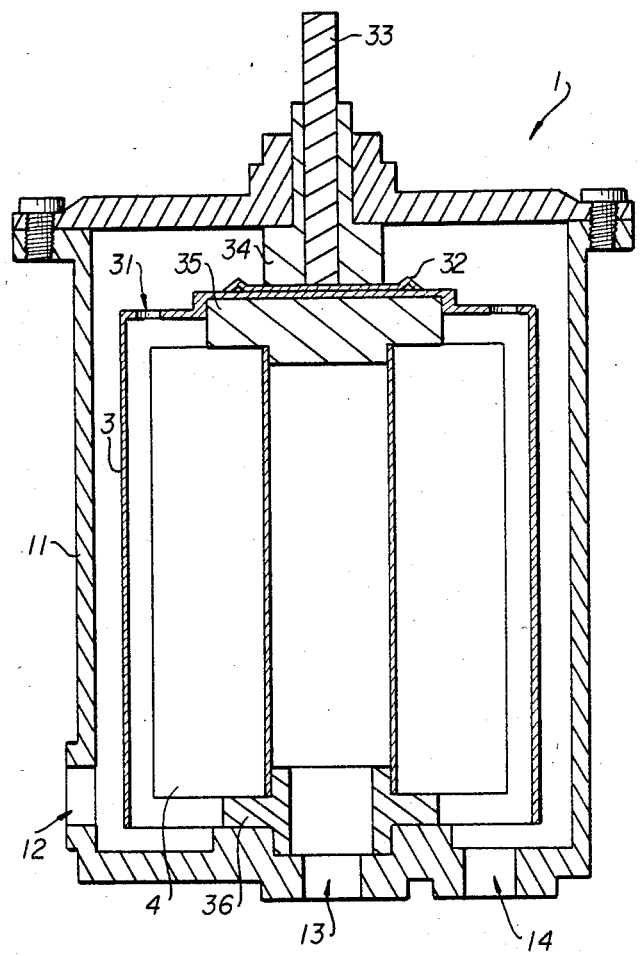
FIG. 3 is another exemplary drawing of the present invention.
Figure 4:
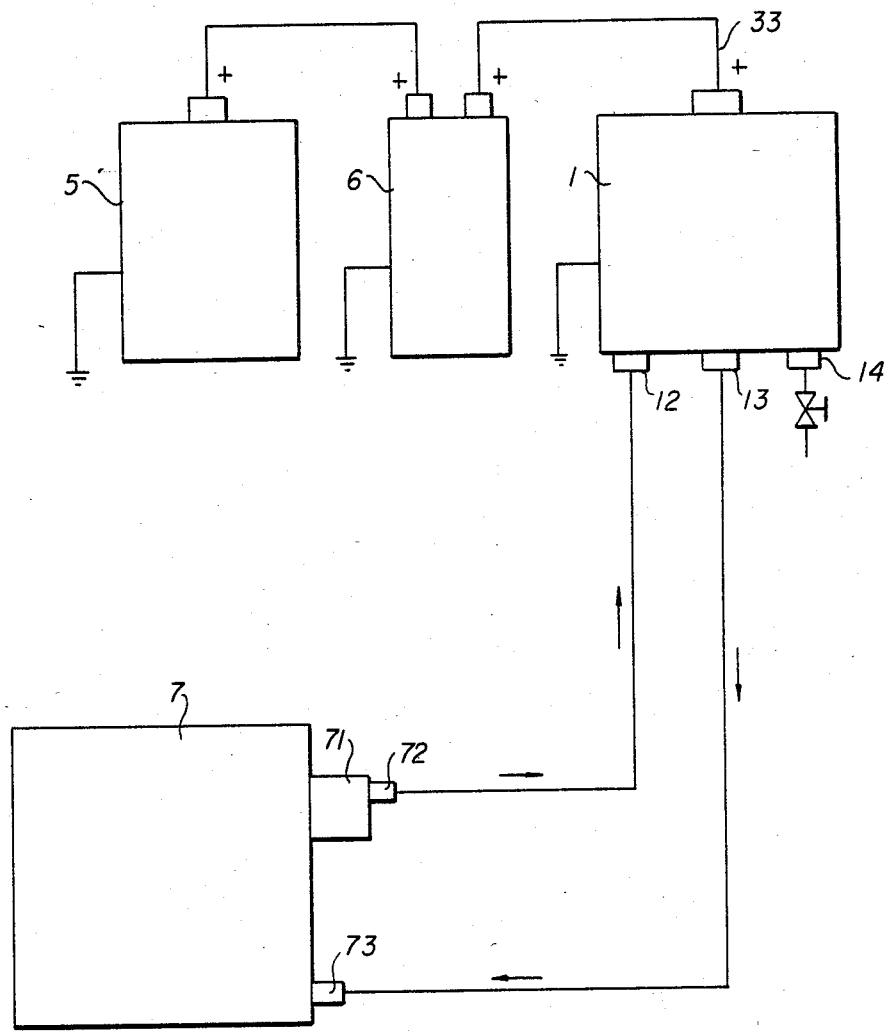
FIG. 4 is the graphic view of the employment of the present invention.

FIG. 3 shows another exemplary drawing of the present invention, wherein the corrugated paper board 2 and the inner casing 15 as shown in FIG. 1 are removed. But this has still achieved very good effects after repeated experiments were conducted over such a design.

I claim:

1. An engine oil cleaner for contaminated oil containing metal particles, moisture, catalysts, and extraneous materials which comprises:
   (a) an outer cylindrical metal casing body having means defining an annular flow passage, a base wall, and a cap bolted to said outer body;
   (b) an inner annular metal casing wall extending vertically upwardly from said base wall to define an inner cavity;
   (c) an upper and a lower insulated member at the top and bottom of said inner cavity;
   (d) an annular filter cartridge held in said cavity by said upper and lower insulated members;
   (e) a polar plate carried by said upper member and having a cylindrical sleeve extending downwardly between said outer body and said inner casing wall;
   (f) a high voltage electrostatic generator connected to said polar plate to form an electrostatic field between said polar cap and sleeve portion and said outer casing wall and said inner casing wall;
   (g) a corrugated porous paper board filter between said outer casing body and said inner casing wall and extending circumferentially therearound;
   (h) means defining an inlet for contaminated oil under pressure in said outer casing body near the bottom thereof; and
   (i) means defining an outlet for filtered oil disposed axially of the bottom of outer casing body beneath said filter cartridge, whereby contaminated oil may flow upwardly through said annular flow passage and downwardly through said filter cartridge while exposed to an electrostatic field, and passing through filtering media of said corrugated porous paper board and said filter cartridge.

* * * * *